(12) United States Patent
Bryant

(10) Patent No.: US 9,399,447 B2
(45) Date of Patent: Jul. 26, 2016

(54) ICE SCRAPER WITH PIVOTING SCRAPER HEAD

(71) Applicant: Charles E. Bryant, Blue Springs, MO (US)

(72) Inventor: Charles E. Bryant, Blue Springs, MO (US)

( * ) Notice: Subject to any disclaimer, the term of this patent is extended or adjusted under 35 U.S.C. 154(b) by 0 days.

(21) Appl. No.: 14/920,486

(22) Filed: Oct. 22, 2015

(65) Prior Publication Data

US 2016/0039392 A1 Feb. 11, 2016

(51) Int. Cl.

| | |
|---|---|
| *A47L 1/16* | (2006.01) |
| *A47L 13/02* | (2006.01) |
| *B60S 3/04* | (2006.01) |
| *A46B 17/08* | (2006.01) |
| *B25G 3/00* | (2006.01) |
| *B25G 1/10* | (2006.01) |
| *A46B 15/00* | (2006.01) |
| *A47L 13/022* | (2006.01) |

(52) U.S. Cl.
CPC ............. *B60S 3/045* (2013.01); *A46B 15/0081* (2013.01); *A46B 17/08* (2013.01); *B25G 1/10* (2013.01); *B25G 3/00* (2013.01); *A47L 1/16* (2013.01); *A47L 13/022* (2013.01)

(58) Field of Classification Search
CPC ........... A47L 1/16; A47L 13/08; A47L 13/02; A47L 13/022; B60S 3/045; B08B 1/005
USPC .............. 15/236.01, 236.02, 236.05, 236.06, 15/111; 30/169; D32/49
See application file for complete search history.

(56) References Cited

U.S. PATENT DOCUMENTS

| | | | | |
|---|---|---|---|---|
| 3,036,322 A * | 5/1962 | Jorgensen | ................. | A47L 1/06 15/111 |
| 4,305,175 A * | 12/1981 | Burgess, Jr. | ............... | A47L 1/16 15/236.02 |
| 4,363,155 A * | 12/1982 | Regina | .................... | B60S 3/045 152/236.02 |
| 5,471,698 A * | 12/1995 | Francis | ................... | A47L 13/08 15/144.1 |
| 6,018,836 A * | 2/2000 | Williams | .................. | A47L 1/16 15/111 |
| 6,282,742 B1 * | 9/2001 | Boggs | ....................... | A47L 1/16 151/143.11 |
| 7,603,780 B2 * | 10/2009 | Oikarinen | ................ | B25G 1/06 15/144.2 |
| 2011/0188923 A1 * | 8/2011 | Lafleur | ................ | A46B 5/0075 403/53 |

* cited by examiner

*Primary Examiner* — Laura C Guidotti
(74) *Attorney, Agent, or Firm* — Kenneth W. Iles

(57) ABSTRACT

In ice scraper includes a scraper head that is pivotally mounted onto a handle has at least one, but preferably, four different scraping edges. When the scraper edge encounters accumulated ice, the scraper head pivots forward, transmitting more of the force applied to a downward force vector, causing the scraper head to pivot into a position that increase the angle of the scraper head and edge to the ice, thereby more readily removing ice.

19 Claims, 5 Drawing Sheets

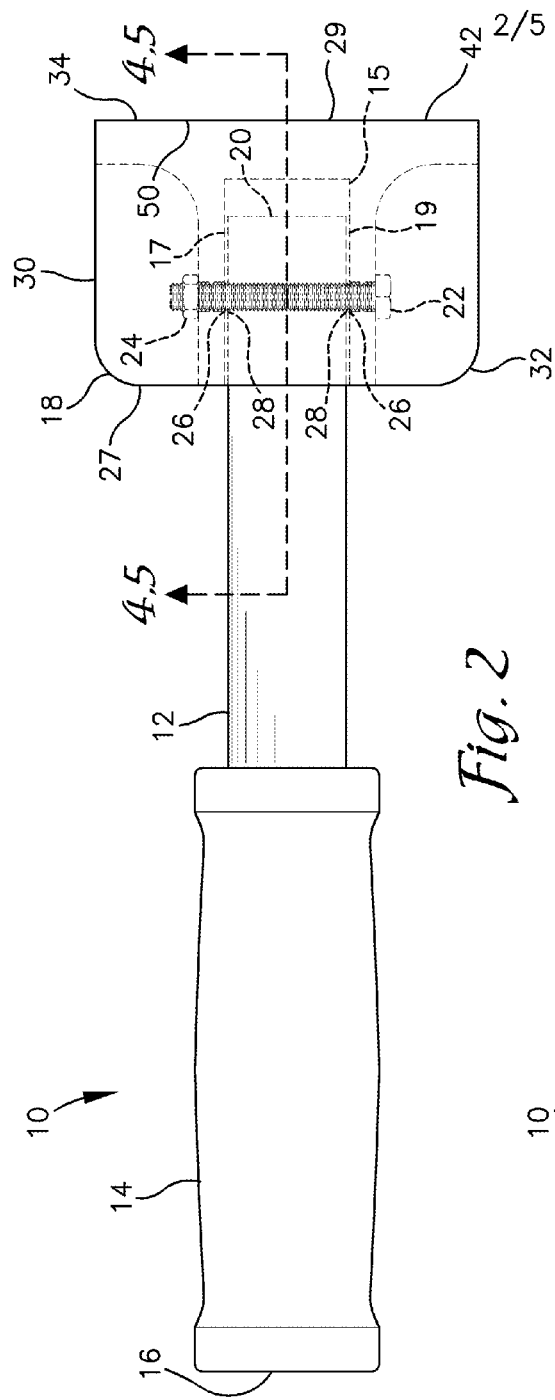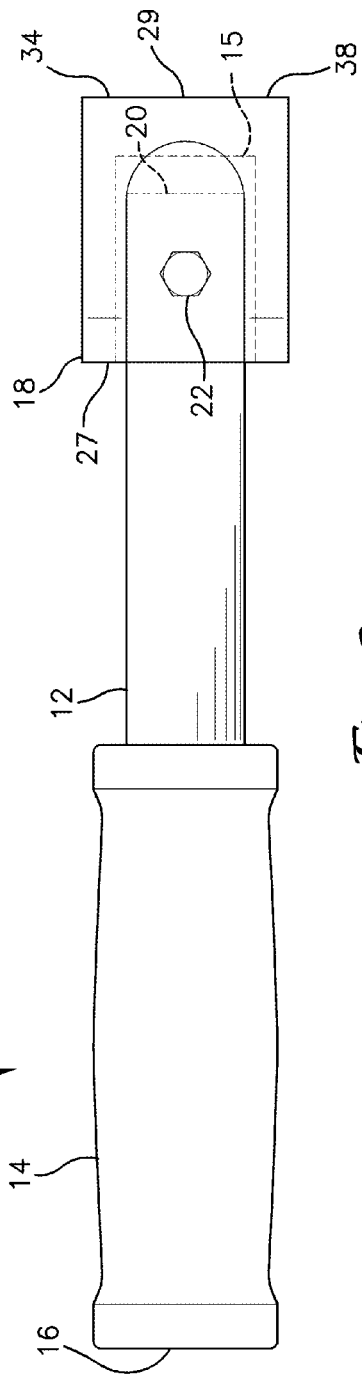

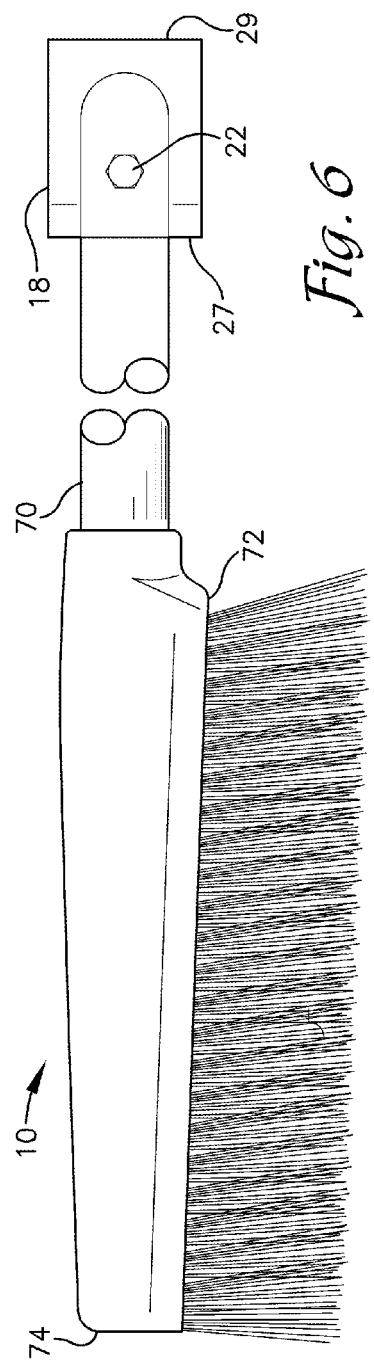
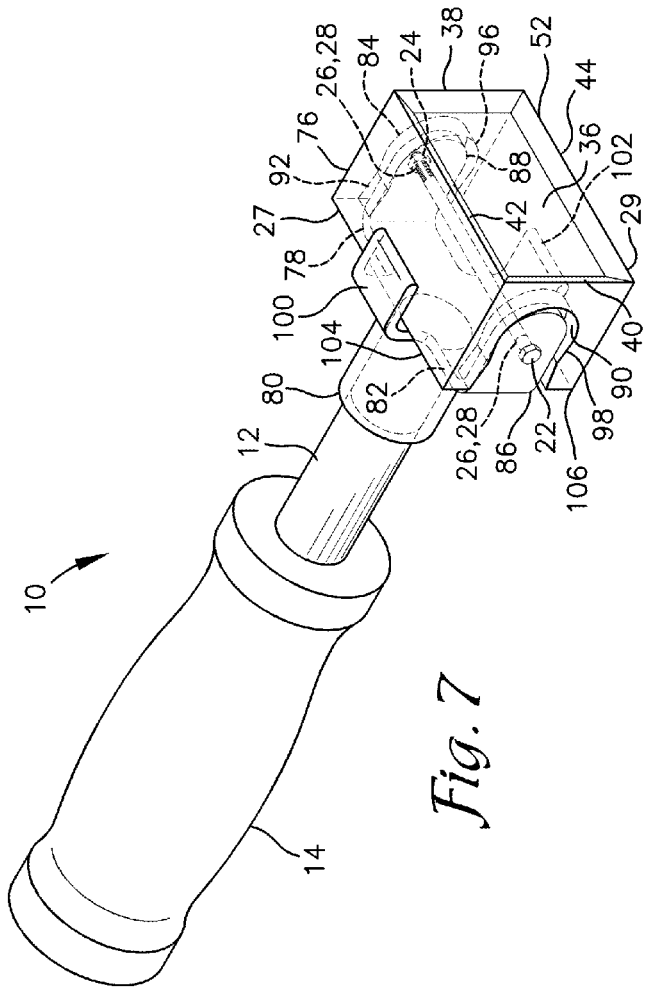

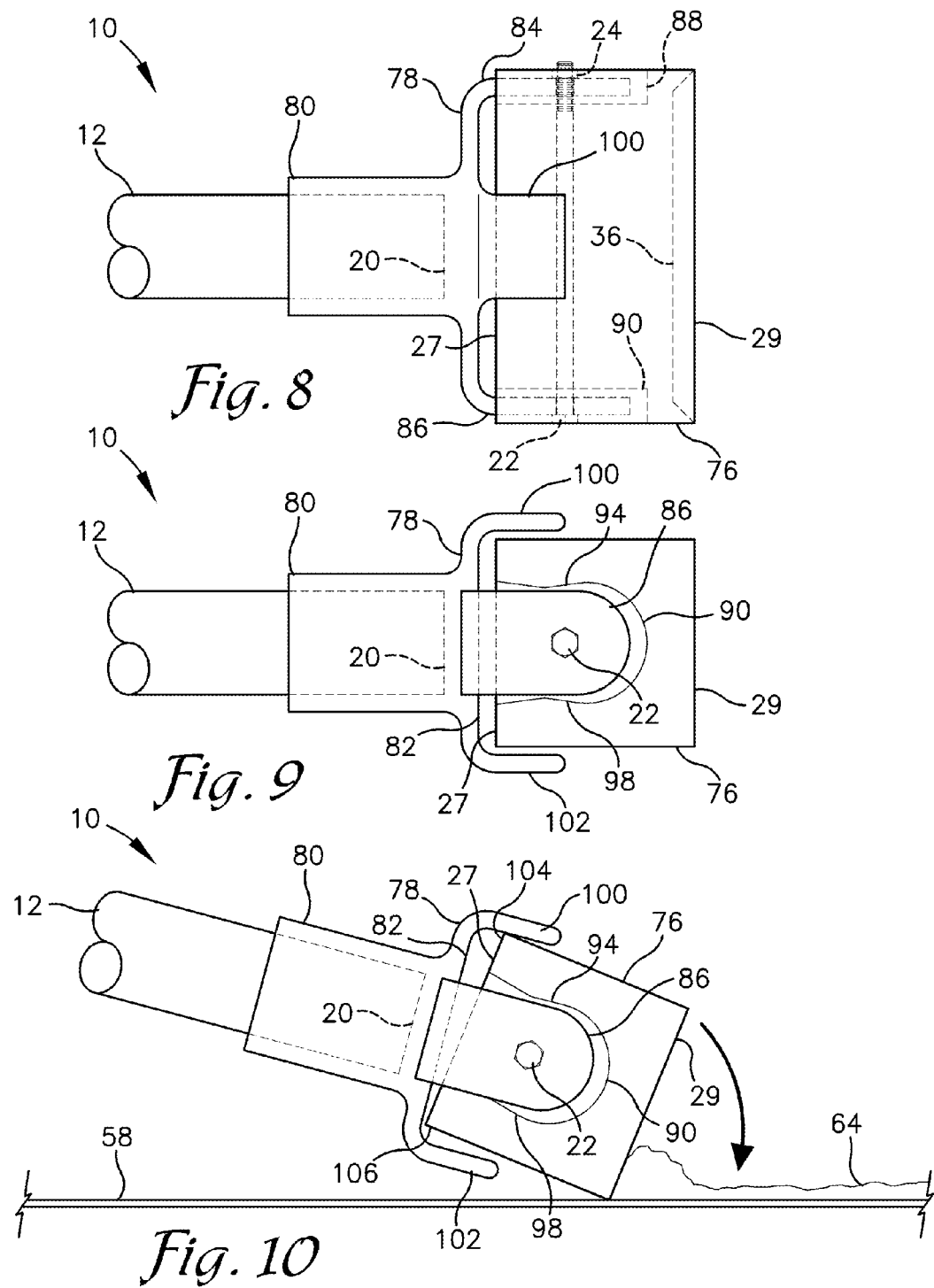

ICE SCRAPER WITH PIVOTING SCRAPER HEAD

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is related to a device for scraping a smooth surface. More particularly the present invention is an ice scraper that can be used to scrape ice from vehicle windows, for example.

DESCRIPTION OF THE RELATED ART INCLUDING INFORMATION DISCLOSED UNDER 37 C.F.R. 1.97 and 1.98

Ice scrapers have long been used for a variety of tasks, including clearing vehicle windows from ice. Ice scrapers for removing ice from vehicle windows are manufactured in wide variety. Some ice scrapers have long handles, allowing the user to reach across a windshield, although typically the resulting low angle of attack to the ice at a long reach is ineffective in dislodging the ice from the windshield. Some ice scrapers include a brush at one end for brushing snow and broken ice from windows. Some ice scrapers have an oversized mitten attached to the end of the handle. Most scrapers have a handle connected to a scraper head, which includes a blade, typically a hard strong plastic beveled at a blunt angle, about 45° or a thinner, typically a thin metal blade held in place in a plastic body. Ice scraper blades are manufactured in a variety of widths, typically ranging from about 7.5 cm (3 inches) to 15 cm (6 inches).

All ice scrapers appear to have in common, however, a handle rigidly connected to a scraper blade. For a user to change the angle at which the blade engages the substrate to be scraped, the user must change the angle of the handle to the substrate to be scraped. If a thin layer of ice has accumulated on a substrate, a shallow angle of engagement may prove adequate to removing the ice. A low angle of engagement allows the user to make longer scraping strokes.

When, however, the accumulated ice is thick, it seems to adhere more firmly to the substrate, typically glass, so removing the ice requires greater force. When a shallow angle of engagement is used and the ice is thick, the ice scraper typically only glides across the surface of the ice, or rises up over any ice deposits of a lower height, still gliding across the surface. To effectively engage and remove thick deposits of ice, the angle of engagement of the ice must be increased to a steep angle, for example, typically from about 45° to 90°. The thicker the ice and the more firmly it is adhered to the substrate, the steeper the angle of the scraper handle to the substrate typically is.

When a user increases the angle of the handle and blade of the ice scraper to the substrate, the user's elbow necessarily rises, often above the users' shoulder, which may be uncomfortable and may reduce the force that can be applied to the ice scraper, as the user's chest is opened up beyond the optimum amount for exerting force through use of the chest muscles. The shorter a user is, or the higher the vehicle windows being scraped, the more pronounced these difficulties will be.

When a user drives an ice scraper into the edge of an accumulation of ice on a substrate, typically a motor vehicle windshield or other vehicle window, the scraper blades encounters more resistance, often a very substantial resistence, that can cause the user's arm to stop moving very quickly, an uncomfortable and perhaps, injurious, stopping. Further the amount of downward force, the portion of the force vector directed perpendicularly or nearly perpendicularly to the substrate can only change by the user's changing the angle of the scraper handle to increase the angle of attack of the scraper blade, which may produce an angle in the user's arm or the angle of the wrist to the user's arm, which may be uncomfortable or increase the risk of injury. Particularly when debris or ice is thick or its adhesion to the glass substrate is particularly firm, increasing the downward vector force component removes the ice more effectively Therefore, there is a need for an ice scraper that channels more force in a downward angle into the ice or other obstacle on a windshield or other substrate. There is also a need for an ice scraper that reduces the shock of quick stopping when an accumulation of ice is encountered on a substrate.

BRIEF SUMMARY OF THE INVENTION

Accordingly, it is a primary object of the present invention to provide an ice scraper that directs more of the force applied to its scraper head and blade downward into the obstacle to be removed from a substrate.

It is another object of the present invention to provide an ice scraper that absorbs some of the shock of encountering an obstacle on a substrate.

These and other objects of the present invention are achieved by providing an ice scraper having a handle connected to a scraper head, with the scraper head including a recess or bore into which the distal end of the cylindrical handle is fitted. The bore or recess in the scraper head is of a greater dimension than the handle, being essentially a cylinder with two parallel slightly flattened sides. The handle is secured into the elongated bore or recess by an axle bolt passing through aligned apertures in the two parts and is secured by a nut. Since the handle is loose inside the elongated bore, the scraper head can pivot about the axis of the axle bolt. In a first position (FIG. 4), when the sharpened scraping edge of the scraper head contact the substrate without significant downward force, the upper portion of the ice scraper handle comes into contact with the upper portion of the scraper head handle cavity. In a second position (FIG. 5), when the scraper head encounters accumulated ice on the substrate, the additional resistance that is encountered automatically causes the scraper head to rotate clockwise until the lower surface of the handle contacts the lower edge of the handle receiving cavity, stopping further rotation of the scraper head. The automatic rotation of the scraper head changes the angle of attack of the sharpened scraper edge, bringing it closer to the nearly ideal 90°. This forward and downward pivoting of the scraper head applies greater downward force to the scraper blade and more readily scraping ice or other obstacles from the substrate. The user topically makes back and forth strokes along the substrate. The back stroke of this scraping action returns the scraper head to position 1. Each forward stroke rotates the scraper head into the second position when accumulated ice is struck by the scraping edge and the back stroke returns the scraper head to position 1. The rotation of the scraper head as described occurs regardless of which of the two longer scraper edges is pressed against the substrate.

In another embodiment, the scraper head is mounted on a handle in a yoke that provides stops limiting the rotation of the scraper head relative to the axle bolt no matter which scraper edge is presented to the substrate.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWING

FIG. 2 is a top view of the ice scraper of FIG. 1.

FIG. 3 is a side view of the ice scraper of FIG. 1.

FIG. 6 is a side view of an alternative embodiment of the ice scraper of FIG. 1 having a longer handle and a brush attached to the handle.

FIG. 7 is an isometric view of an alternative embodiment of the ice scraper of FIG. 1 having an alternative adapter for fastening the handle on the scraper body.

FIG. 8 is a top view of the ice scraper of FIG. 7.

FIG. 9 is side view of the ice scraper of FIG. 7.

FIG. 10 is a side view of the ice scraper of FIG. 7 showing the ice scraper of FIG. 7 in use as it encounters a build up of ice or another obstacle on a substrate.

DETAILED DESCRIPTION OF THE INVENTION

Figure 1:
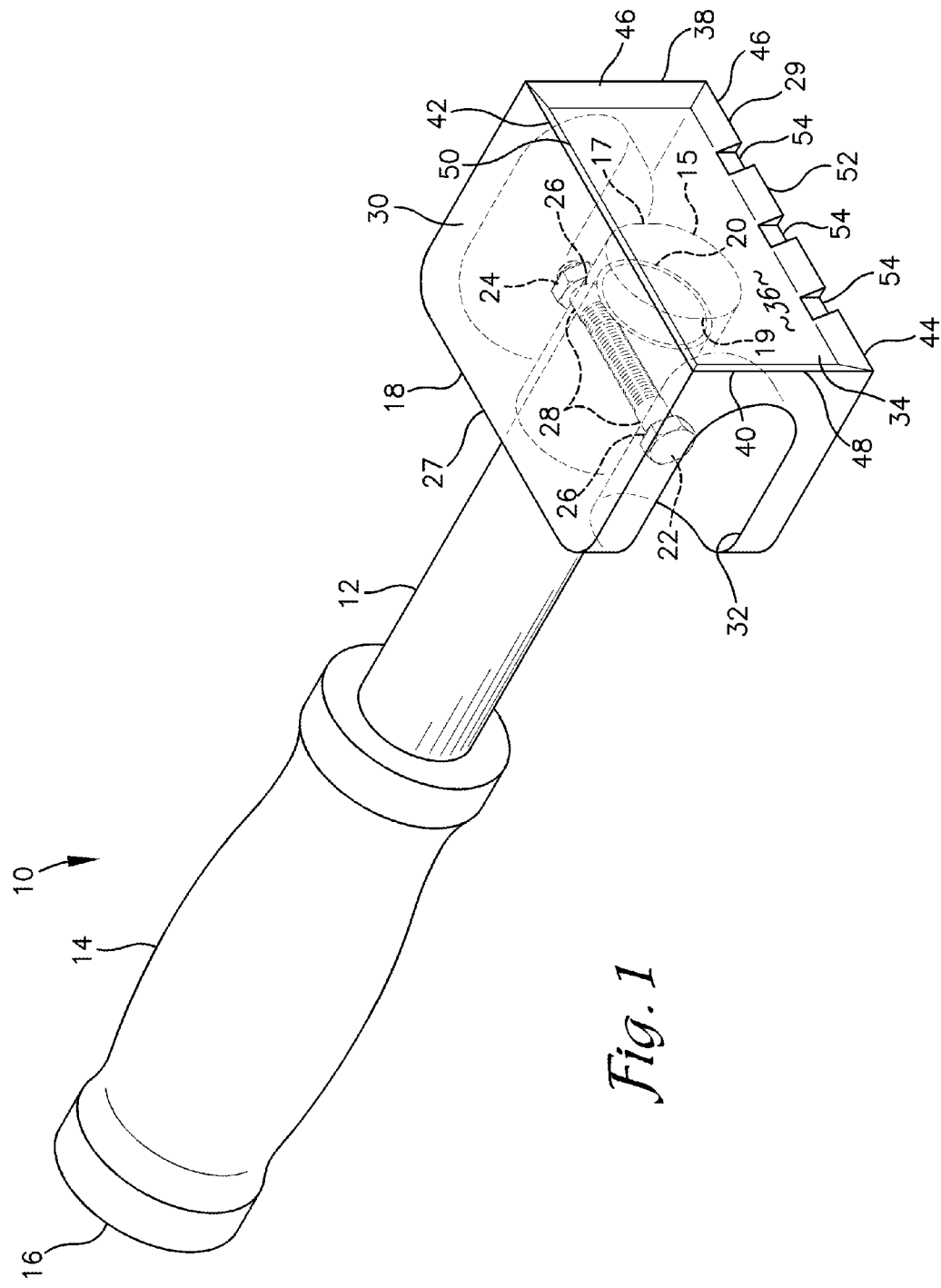
FIG. 1 is an isometric view of an ice scraper according to the present invention.

Referring to FIGS. 1-3, an ice scraper 10 according to the present invention includes a handle 12, which is preferably hollow and tubular, as shown, or solid, and is generally cylindrical, having a gripping sleeve 14 along a length of the handle 12 beginning at the proximal end 16 of the handle 12 and may be slipped over the proximal end 16 of the handle 12 and held in place by natural friction or an adhesive. The gripping sleeve 14 is long enough to accommodate the width of a user's hand, with some margin on either side of the user's hand. The gripping sleeve 14 is made from a relatively soft, relatively high friction material such as rubber or plastic. In an alternative embodiment, the gripping sleeve may be omitted.

Figure 4:
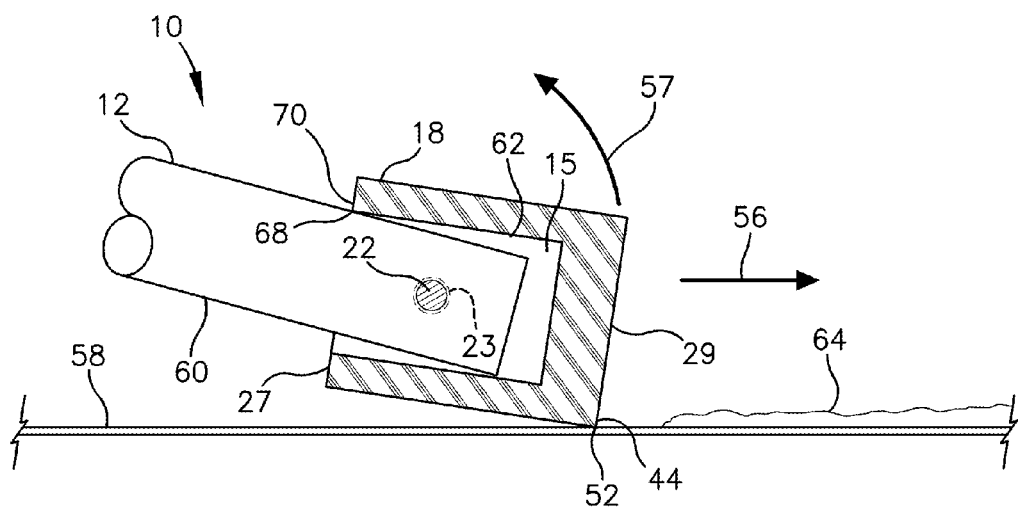
FIG. 4 is a cross section of the ice scraper of FIG. 1 taken along lines 4-4 of FIG. 1 showing the blade of the ice scraper engaging a substrate in, which is a first position.
Figure 5:
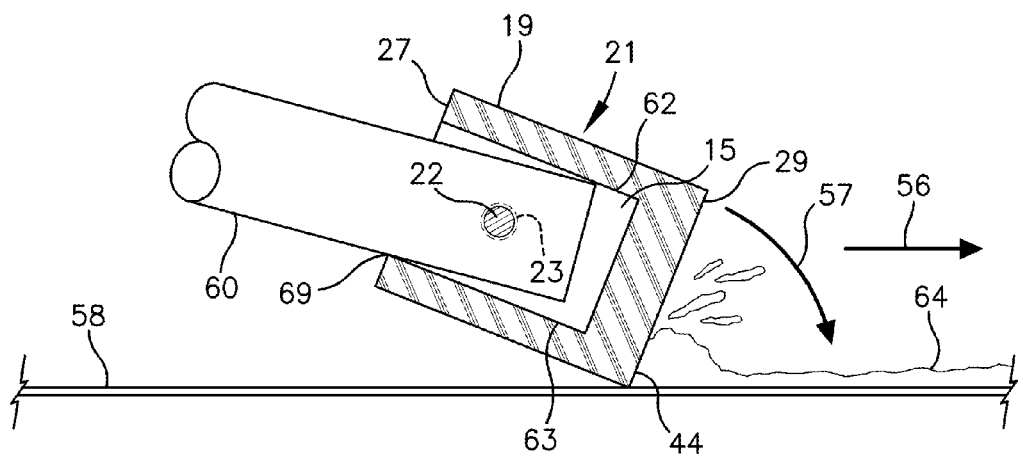
FIG. 5 is a cross section of the ice scraper of FIG. 1 taken along lines 5-5 of FIG. 1 showing the blade of the ice scraper engaging an accumulation of ice on the substrate, which is a second position.

A scraper head 18, which is typically injection molded or machined from a single piece of hard plastic. The handle 12 is slid into a cylindrical handle receiving cavity 15 formed into the scraper head which is attached to the handle 12 adjacent to the distal end 20 of the handle 12 by the axle bolt 22, which serves as an axle and is perpendicular to the handle 12, allowing the scraper head 18 to pivot, and nut 24, with the axle bolt 22 being passed through the aligned apertures 26 in the scraper head 18 and the aligned apertures 28 in the handle 12, which is then secured by the nut 24. The handle cavity 15 extends further into the scraper head 18 than the distal end of the handle 12, allowing the scraper head 18 to toggle up and down on the scraper handle 12, which the user will typically hold at basically the same angle to the substrate throughout a scraping stroke (See, FIGS. 4, 5). The handle bore or cavity 15 is essentially cylindrical, but with slightly flattened parallel side walls, a left side flattened side wall 17 and a right side flattened side wall 19, which form a narrower cavity than the curved cylindrical remaining portion of the handle bore 15. The flattened side walls 17, 19 provide minimal clearance with the handle 12, further limiting and preventing the handle 12 from wiggling from right to left during use, that is in directly nearly all scraping force forward as shown in FIGS. 4, 5. The scraper head 18 includes a left side recess 30 and a right side recess 32, which are symmetrical and of identical shape and dimensions. These recesses 30, 32 are designed to reduce the weight and amount of material in the scraper head 18, as well as to shield the ends of the axle bolt 22 from easy user contact. The front portion 34 of the scraper head 18 includes a recessed face 36 surrounded by four straight scraping edges or blade that project outwardly from the front of the recessed face 36 along its perimeter. Providing two parallel long scraping edges and two parallel scraping edges provides the user with multiple scraping edges, extending the service life of the ice scraper 10, e.g., in case a scraping edge becomes dull or chips, and increasing the flexibility of use, as the shorter scraping edges may fit into spaces where the longer scraper edges will not fit. The recessed face 36 is preferably flat and rectilinear, but may be any polygonal shape. The entire scraper head 18 is substantially a rectilinear solid block with the described openings and bore or cavity. These characteristics also apply to the embodiment shown in FIGS. 7-10 below, except there is no handle receiving bore or cavity and the openings are different.

The aligned apertures 26 in the scraper head 18, which receive the axle bolt 22, are located closer to the rear edge 27 of the scraper head 18 than to the front edge 29 of the scraper head 18. This position of the axle bolt 22 behind the center of gravity of the scraper head 18, that is there is more weight of the scraper head 18 in front of the axle bolt 22 than behind it. This placement of the aligned apertures 26 results in a greater portion of the weight of the scraper 18 lying in front of the aligned apertures 26 than behind them. Therefore, when the handle 12 of the ice scraper 10 is held horizontally in space, the scraper head 18 falls downwardly in a clockwise rotation relative to FIG. 1. When the scraper head 18 is put into contact with a substrate 58 (FIG. 4) with the handle 12 at a shallow angle, the scraper head 18 rotates slightly counterclockwise, which causes the contact point 68 between the handle 12 and the scraper head 18 as shown in FIG. 4, that is, little force is required to rotate the scraper head 18 in either direction. It has been found that unless the axle bolt 22 is placed slightly behind the center of balance of along a line parallel to the scraping edge 52, the required pivoting of the scraper head 18 as described in relation to FIG. 5 does not occur.

The recessed flat face 36 of the scraper head 18 is rectangular, having a short left side 38, a short right side short side 40, a long upper side 42 and a long lower side 44. Each side 38, 40, 42, 44 has outwardly projecting sharpened scraper edges 46, 48, 50, 52, respectively, formed at about 40° to the outer surfaces of the scraper head 18 adjacent to, and forward of, the recessed flat face 36. The scraper edge 52 includes three notches 54 cut into it to form channels that allow shattered ice debris to be channeled away from the scraper blade 52, while the other three scraper edges 26, 48, 50 are straight and uniform throughout their lengths. Having four separate scraper edges 46, 48, 50, 52 increases the utility of the ice scraper 10 by providing fresh scraping surfaces should one become damaged and provides two different sizes of scraper blades, which can improve accessability to certain areas of a substrate.

Referring to FIG. 4 showing the scraper head 18 in a first position, the scraper edge 52 is shown moving in the direction of the arrow 56 in contact with the substrate 58 with no obstacles under the scraper edge 52 along the long lower edge 44. In this case, the upper side wall 60 of the handle 12 is stopped at the handle contact point 68 with the sidewall 62 of the handle cavity 15 and the forces directed down the handle 12 are directed essentially along a single vector line at an angle as shown in FIG. 4, to the long lower side 44 and the corresponding sharpened scraper edge 52. This straight line vector force operates regardless of which sharpened scraper edge 46, 48, 50, 52 is in contact with the substrate 58 because both the handle 12 and the elongated handle cavity 15 in the scraper head 18 are cylindrical.

Referring to FIG. 5 showing the scraper head 18 in a second position, when the scraper head 18 encounters an obstacle 64, such as accumulated ice on a vehicle windshield or other glass, the sharpened scraper edge 52 of the scraper head 18 tends to be stopped, or its movement in the direction of the arrow 56 slowed, causing the scraper head 18 to pivot quickly, i.e., jerk, clockwise about the axle bolt 22, as indicated by the directional arrow 57, causing the lower side wall 60 of the handle 12 to contact the lower proximal edge 69 of the elongated handle cavity 15 and impacting the accumulated ice 64 with greater force. When the ice scraper 10 is flipped over 180° to present the long upper edge 42 and hence the scraping edge 50 to the substrate 58, the stopping action of the scraper head 18 to the handle 12 is the same as described above. The toggle limits can be operate either in front of or behind the axle bolt 22. The clockwise toggle of the scraper head 18 in relation to the handle 12 provides a quick effective angle changes and transfer of forces to a more effective angle of attack of the ice or other obstacle, as shown in FIGS. 4, 5. The altered vector forces increase the velocity of, and force on, the scraping edge 52 that is directed to the sharpened scraper edge 52, or the edge 50, by creating a much larger downward component and directing more of the user's force down into the obstacle 64, causing the sharpened scraper edge 52 to bite into the obstacle 64, thereby increasing the chipping or obstacle removable force without the user's having to change the angle of the hand or arm to the handle 12. This allows the user to keep the user's wrist and arm straight, decreasing the strain on the wrist while increasing the effectiveness of removing the obstacle 64 from the substrate 58. This toggle of the scraper head 18 up or down in the embodiment of FIGS. 4, 5, operates only when the sharpened scraping edges 50, 52 are presented to the substrate 58 because the placement of the off-centered axle bolt 22 allows for pivoting when these edges are presented to the substrate 58. When either short side sharpened scraper edges 46, 48 are presented to the substrate 58, the straight vector forces in effect in FIG. 4 are directed to the short side sharpened scraper edge 46, 48. The user's choice of whether to use the ice scraper 10 with the handle 12 substantially rigidly connected to the scraper head 18 or to use the ice scraper 10 in position where the scraper head 18 toggles relative to the handle 12 increases the utility of the ice scraper 10.

Referring to FIG. 6, another embodiment of the ice scraper 10 includes an elongated cylindrical handle 70 of any desirable length having a brush 72 attached adjacent to the proximal end 74 of the elongated cylindrical handle 70. The brush 72 can be used to brush debris from the substrate 58 after it has been loosened and broken up by the scraper head 18.

Referring to FIGS. 7-10, the handle 12 is connected to a modified scraper head 76 by a yoke 78 having a sleeve 80 that slips over the distal end of the handle 12 and is held in place by a staple or other fasteners, including, for example, screws, rivets, glue, friction and the like. The yoke 78 includes a backing portion 82 with a left ear 84 and a right ear 86, both formed perpendicular to the backing portion 82 and connected to it and formed as part of it and projecting forward and lying parallel to one another. The spaced parallel left ear 84 and the right ear 84 both have the same shape, which is essentially rectangular with a segment of a circle defining the distal end of each. The left ear 84 fits into a left ear recess 88 and the right ear 86 fits into a right ear recess 90. The ear receiving recesses 88, 90 are the same shape as the ears 84, 86, but with slightly larger dimensions. The ears 84, 86 are seated in the ear receiving recesses 88, 90, so the upper edge 92 of the left recess 88 and the upper edge 94 of the right recess 90 stop the movement of the modified scraper head 76 in a clockwise direction (with reference to FIG. 7) as the ears 84, 86 bump into these edges 92, 94. The lower edge 96 of the left recess 88 and the lower edge 98 of the right recess 90 stop the movement of the modified scraper head 76 in a counterclockwise direction (with reference to FIG. 7) when the bottom edges of the ear 84, 86 bump into the lower edges 96, 98. An axle bolt 22 fastens the ears 84, 86 to the modified scraper head 76, passing through aligned aperture, with the ears 84, 86 serving as the arms of the yoke 78. The positioning of the axle bolt 22 is the same as described above in the discussion of FIG. 1.

A further stop mechanism is found in a top tab 100 and a bottom tab 102 that are both likewise perpendicular to the backing member 82 and are connected to it or extend from it, and project forward and are parallel to one another. Each tab 100, 102 has the same shape, which is square. The top tab 100 stops the clockwise rotation, as seen in FIG. 7, of the modified scraper head 76 when the rear top edge 104 of the modified scraper head 76 bumps into it. The bottom tab 102 stops the counterclockwise rotations, as seen in FIG. 7, when the rear bottom edge 106 of the modified scraper head 76 bumps into it. Each of the forward projecting members 84, 86, 100, 102 serves as a stop to stop the rotation of the modified scraper head 76 is the direction of rotation described above. The two ears 84, 86 and associated recesses 88, 90 and the tabs 100, 102 stop the rotation of the modified scraper head 76 whenever either long side sharpened scraper edges 50 or 52 is that is presented to substrate 58 and the matter being scraped, changing the angle of attack of the accumulated ice 64 on the substrate 58 to closer to 90°, as shown in FIG. 10 and as described in detail above in relation to FIGS. 1, 4, 5.

The stops described above may all be employed on the ice scraper 10 of FIG. 7. In a different version of the embodiment of FIG. 7, the top tab 100 and the bottom tab 102 may be omitted while the left ear 84 and right ear 86 and the left ear receiving recess 88 and the right ear receiving recess 90 are retained, providing sufficient stops. In another version, the left ear 84 and the right ear 88 may be omitted while the top tab 100 and the bottom tab 102 are retained, also providing adequate stops. In this later case, the yoke 78 may include arms that lie outside of the top view profile of the modified scraper head 76 (FIG. 8), eliminating the need for the ear receiving recesses 88, 90, thereby simplifying the manufacture of the modified scraper head 76 and reducing its cost. Naturally, the ears 84, 86, may be formed in any desired shape and size and then be received in same or similar shaped receiving recesses 88, 90. Likewise, the tabs 100, 102 may be of any desired shape and size and may be so constructed that their full bottom surface contacts the adjacent surface of the modified scraper body 76 or contacts only an adjacent edge of the modified scraper body 76.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. An ice scraper comprising:
   a. a handle having a proximal end and a distal end;
   b. a scraper head, said scraper head further comprising a block having a flat polygonal recessed face and at least one scraping edge projecting from an edge of said flat polygonal recessed face;
   c. a substantially cylindrical handle receiving cavity formed in said scraper head oriented parallel to said handle with said handle being inserted into said substantially cylindrical handle receiving cavity; and
   d. means for pivotally fastening said scraper head to said handle.

2. An ice scraper according to claim 1 wherein said pivoting means further comprises an axle bolt secured through said handle receiving cavity and said distal end of said handle, said scraper head being pivotally mounted on said bolt for pivoting rotation of said scraper head relative to said handle.

3. An ice scraper according to claim 1 wherein said handle receiving cavity further comprises a substantially cylindrical bore having two parallel flattened side walls.

4. An ice scraper according to claim 3 wherein said axle bolt is positioned such that more of the weight of said scraper head lies in front of said axle bolt than behind said axle bolt.

5. An ice scraper according to claim 1 wherein said scraper head further comprises one scraper edge projecting from each of four edges of said recessed face of said scraper head.

6. An ice scraper according to claim 5 further comprising at least one notch formed in at least one said sharpened scraper edge.

7. An ice scraper according to claim 1 further comprising a left side recess in said scraper head and a right side recess in said scraper head.

8. An ice scraper according to claim 1 further comprising a yoke having a sleeve for mating with a distal end of said handle and a pair of spaced parallel ears extending forward of a backing portion of said yoke and an axle bolt pivotally connecting a scraper head to said yoke.

9. An ice scraper according to claim 8 further comprising a pair of spaced opposed parallel recesses in said scraper head with one said ear seated in one of said recesses.

10. An ice scraper according to claim 8 further comprising a top tab and a bottom tab on said yoke with said top tab extending forward over a top surface of said scraper head and said bottom tab extending forward under a bottom surface of said scraper head.

11. An ice scraper in according to claim 1 further comprising a brush fastened to said handle.

12. An ice scraper according to claim 1 wherein said distal end of said handle is inserted into said substantially cylindrical handle receiving cavity by less than the length of said substantially cylindrical handle receiving cavity.

13. An ice scraper comprising:
   a. handle having a proximal end and a distal end;
   b. a scraper head, said scraper head further comprising a block having a flat polygonal recessed face and at least one scraping edge projecting from an edge of said flat polygonal recessed face connected to said handle; and
   c. an axle bolt through said scraper head and said distal end of said handle for pivotally fastening said scraper head to said handle wherein said axle bolt is positioned such that more of the weight of said scraper head lies in front of said axle bolt than behind said axle bolt, whereby said scraper head pivots downward quickly about said axle bolt when an obstacle is encountered on a substrate thereby impacting the accumulated obstacle with greater force.

14. Au ice scraper according to claim 13 further comprising a tubular handle.

15. An ice scraper according to claim 13 wherein said scraper head further comprises four scraper edges arranged in a rectangle and projecting outwardly from the edges of a recessed rectangular face of said scraper head.

16. An ice scraper according to claim 13 having a gripping sleeve secured to said handle adjacent to a proximal end of said handle.

17. An ice scraper comprising:
   a. a handle having a proximal end and a distal end;
   b. a scraper head, said scraper head further comprising a substantially rectilinear block having a flat rectangular recessed face and one scraping edge projecting from each of four edges of said flat rectilinear recessed face connected to said handle; and
   c. an axle bolt through said scraper head and said distal end of said handle for pivotally fastening said scraper head to said handle.

18. An ice scraper according to claim 17 further comprising a yoke having a sleeve for mating with a distal end of said handle and a pair of spaced parallel ears extending forward of a backing portion of said yoke and an axle bolt pivotally connecting a scraper head to said yoke and a pair of spaced opposed parallel recesses in said scraper head with each said ear seated in a corresponding said recess.

19. An ice scraper according to claim 18 further comprising a top tab and a bottom tab on said yoke with said top tab extending forward over a top surface of said scraper head and said bottom tab extending forward under a bottom surface of said scraper head.

* * * * *